(12) United States Patent  
Wang et al.

(10) Patent No.: US 8,867,344 B2
(45) Date of Patent: Oct. 21, 2014

(54) METHODS FOR BUS DATA TRANSMISSION AND SYSTEMS UTILIZING THE SAME

(75) Inventors: Chuan-Hung Wang, Kaohsiung County (TW); Chien-Kuang Lin, Taipei County (TW); Chin-Tai Liu, Nantou County (TW); Chu-Ming Lin, Hsinchu (TW)

(73) Assignee: Mediatek Inc., Hsin-Chu (TW)

( * ) Notice: Subject to any disclaimer, the term of this patent is extended or adjusted under 35 U.S.C. 154(b) by 1175 days.

(21) Appl. No.: 12/407,186

(22) Filed: Mar. 19, 2009

(65) Prior Publication Data

US 2010/0014437 A1 Jan. 21, 2010

Related U.S. Application Data

(60) Provisional application No. 61/082,245, filed on Jul. 21, 2008.

(51) Int. Cl.
*H04L 12/26* (2006.01)
*H04L 12/801* (2013.01)
*H04L 12/861* (2013.01)
*H04L 1/18* (2006.01)

(52) U.S. Cl.
CPC ............... *H04L 47/10* (2013.01); *H04L 49/90* (2013.01); *H04L 1/188* (2013.01)
USPC .......................... 370/230; 370/412; 714/748

(58) Field of Classification Search
CPC ... H04L 1/1809; H04L 1/1812; H04L 1/1887; H04L 1/1819; H04L 1/188; H04L 47/10; H04L 2012/5631; H04L 47/15; H04L 47/2441; H04L 47/70; H04L 49/90; H04L 2012/5681
USPC ........................... 370/229–236, 394, 412–419
See application file for complete search history.

(56) References Cited

U.S. PATENT DOCUMENTS

| 4,616,359 | A | * | 10/1986 | Fontenot | 370/230 |
| 5,084,877 | A | * | 1/1992 | Netravali et al. | 714/748 |
| 6,408,002 | B1 | * | 6/2002 | Quattromani et al. | 370/394 |
| 6,516,442 | B1 | * | 2/2003 | Wang et al. | 714/776 |
| 6,621,796 | B1 | * | 9/2003 | Miklos | 370/236 |
| 7,106,742 | B1 | * | 9/2006 | Frisch et al. | 370/394 |
| 2001/0030964 | A1 | * | 10/2001 | Marietta et al. | 370/394 |
| 2005/0254488 | A1 | * | 11/2005 | Huang | 370/389 |

* cited by examiner

*Primary Examiner* — Steven H Nguyen

(74) *Attorney, Agent, or Firm* — McClure, Qualey & Rodack, LLP

(57) ABSTRACT

A method for data transmission in a device coupled to a host via a bus is provided. A sequence of data packets are received from the host and the received data packets are stored into a buffering unit of the device. It is then determined whether a predetermined error has occurred. When the predetermined error has occurred, the buffering unit of the device is locked to stop receiving the data packets. Thereafter, the buffering unit of the device is unlocked according to an unlock request from the host to resume receiving subsequent data packets.

23 Claims, 8 Drawing Sheets

METHODS FOR BUS DATA TRANSMISSION AND SYSTEMS UTILIZING THE SAME

CROSS REFERENCE TO RELATED APPLICATIONS

This application claims the benefit of U.S. Provisional Application No. 61/082,245, filed on Jul. 21, 2008, the entirety of which is incorporated by reference herein.

BACKGROUND OF THE INVENTION

1. Field of the Invention

The invention relates to a method for bus data transmissions, and more particularly to a method for bus data transmissions between a host and a device that is capable of handling abnormal bus conditions and resuming transmissions.

2. Description of the Related Art

Currently, data transmitted by packets are a common technique used in a bus for streaming data transmission. To achieve high bus utilization, multiple packets are packed into one data transmission. For the purpose of device memory resource management and to avoid unnecessary memory usage, a specific hardware e.g. a queue management unit (simply referred to as a QMU hereinafter) is designed to parse the transmission data and put the packets into the corresponding buffers instead of parsing the transmission data to the buffers by the software instruction. However, once the synchronization between the host and the QMU is lost, packets in the transmissions can't be correctly separated into the corresponding buffers.

For example, if a length field indicating the packet length of the data packet in the packet header is corrupted due to abnormal bus conditions such as a bus error, and a transmission is aborted or a similar error results in lost of synchronization and/or packet being damage, the QMU can't correctly separate packets from the transmission because the boundary between the packets is defined by the length field.

Thus, correctly retransmitting the damaged packets when abnormal bus conditions occur is an important issue.

BRIEF SUMMARY OF THE INVENTION

An exemplary embodiment of a method for data transmission in a device coupled to a host via a bus is provided. A sequence of data packets are received from the host and the received data packets are stored into a buffering unit of the device. It is then determined whether a predetermined error has occurred. When the predetermined error has occurred, the buffering unit of the device is locked to stop receiving the data packets. Thereafter, the buffering unit of the device is unlocked according to an unlock request from the host to resume receiving subsequent data packets.

Furthermore, an exemplary embodiment of a data transmission system comprising a host, a bus and a device is also provided. The host provides a sequence of data packets. The device is coupled to the host via the bus and has a buffering unit for receiving the sequence of data packets from the host and storing the received data packets into the buffering unit, determining whether a predetermined error has occurred, locking the buffering unit of the device to stop receiving the data packets when the predetermined error has occurred, and unlocking the buffering unit of the device according to an unlock request from the host to resume receiving subsequent data packets.

Moreover, another exemplary embodiment of a method for data transmission between a device and a host via a bus is provided. A sequence of data packets, each with a packet header, is transmitted. The transmitted data packets from the host are received and the received data packets are stored into a buffering unit of the device. It is then determined whether a predetermined error has occurred. The buffering unit of the device is locked to stop receiving the data packets when the predetermined error has occurred. Next, it is determined whether a signal triggered by the device for informing that the predetermined error has occurred is received. An unlock request is sent to the device for unlocking the buffering unit of the device. Thereafter, subsequent data packets are retransmitted to the device.

Moreover, another exemplary embodiment of a data transmission apparatus for handling an abnormal bus condition is provided. The data transmission apparatus comprises a buffer unit for receiving a sequence of data packets and storing the received data packets; wherein the buffering unit is locked to stop receiving the data packets when at least one predetermined error has occurred; and wherein the buffering unit is unlocked according to an unlock request from the host to resume receiving subsequent data packets.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
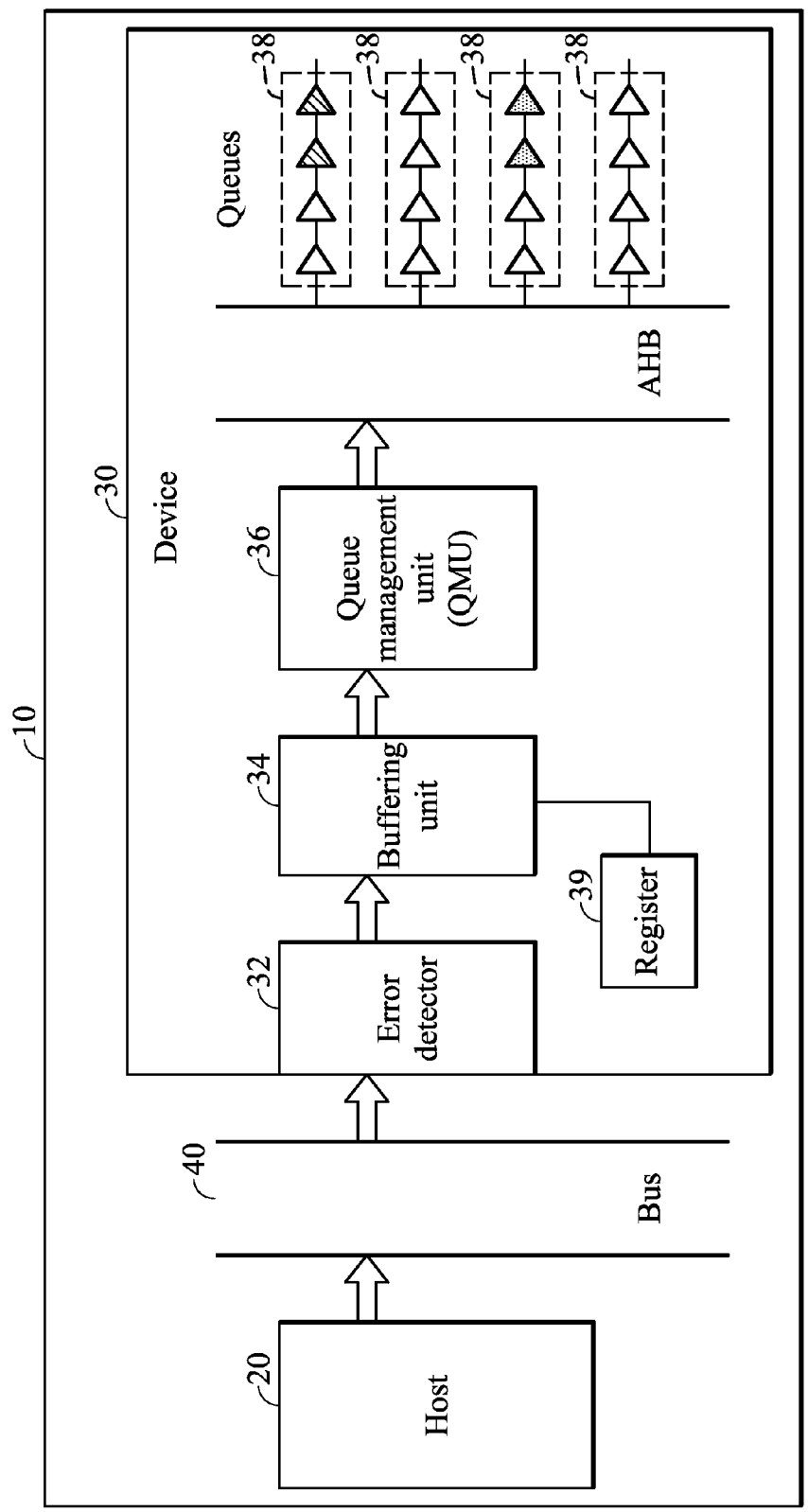
FIG. 1 shows a schematic diagram of a data transmission system according to an embodiment of the invention.

FIG. 1 shows a schematic diagram of a data transmission system according to an embodiment of the invention. In FIG. 1, a transmission system 10 comprises a host 20, a device 30 and a bus 40 such as a Secure Digital Input/Output (SDIO) bus, a Universal Serial Bus (USB) or similar serial buses, wherein the bus 40 is coupled between the host 20 and the device 30 for performing data transmission there-between. The host 20 may pack a sequence of data packets into one data transmission and then transmit the packed data packets to the device 30 via the bus 40. Each data packet may have a packet header which provides information corresponding to the data packet, such as length or type of the data packet.

Figure 2:
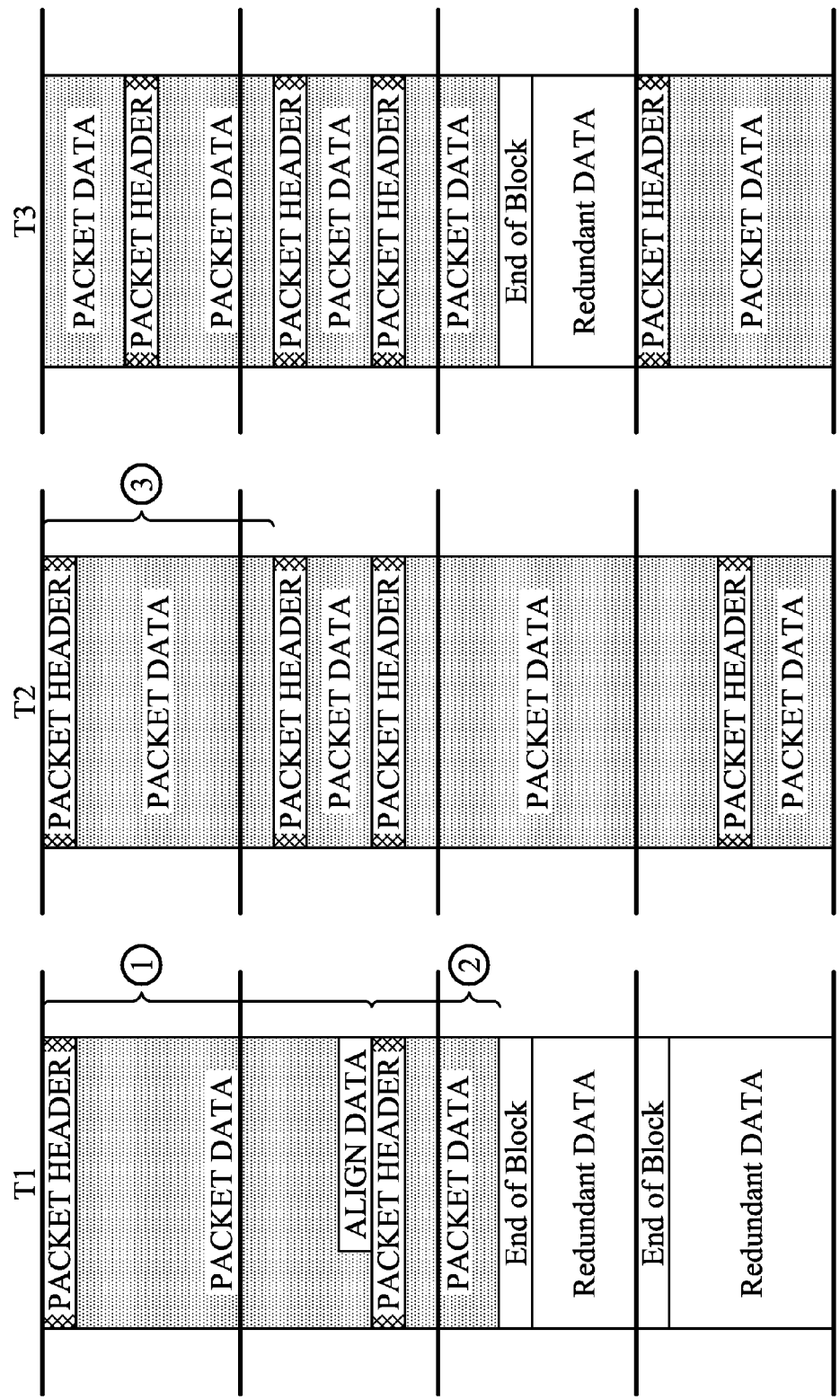
FIG. 2 is a schematic diagram illustrating an example of transmission data.

FIG. 2 shows a schematic diagram illustrating an example of transmission data. In FIG. 2, three transmissions T1, T2 and T3 are illustrated in which transmissions T1, T2 and T3 are transmitted sequentially. Each transmission may contain different number of data packets and different size of data packets or data blocks. Each data block may comprise multiple data packets, wherein the end of the data packet is identified by an "end of block" label. Each data packet may have a packet header comprising information of its packet length and its type and packet data. The packet header is detailed below. Redundant data blocks are inserted between the data blocks. Each data block may comprise a cyclic redundancy check (CRC) value and the data block is identified as being corrupted if a CRC check with its CRC value fails.

Figure 3:
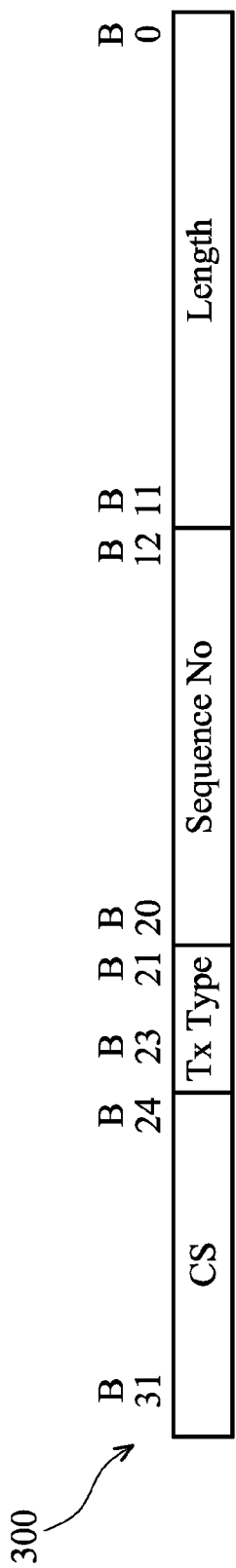
FIG. 3 is a schematic diagram illustrating an example data format of a packet header of the received data packet according to an embodiment of the invention.

FIG. 3 is a schematic diagram illustrating an example data format of a packet header 300 of the received data packet according to an embodiment of the invention. As shown in FIG. 3, the packet header 300 may comprise a packet length field "Length" which indicates the length of the data packet, a sequence number field "Sequence no" which indicates a unique sequence number for the data packet, a transmission type field "Tx Type" which indicates the transmission type of the data packet, and a checksum field "CS" which indicates a checksum value of the data packet. The packet length field "Length" may be used to determine the boundary between the data packets. Before transmission, each data packet is assigned a unique sequence number according to a transmission order and thus it may be used to identify the individual data packet. For example, referring to FIG. 2, the data packet with a sequence number 02 is transmitted after the data packet with a sequence number 01 and is transmitted before the data packet with a sequence number 03. The transmission type "Tx Type" field is used to determine the distribution queue for the data packet, which is later used by the QMU 36. For example, the transmission type of the data packet may be length, type or priority of the data packet. The data packets with the same transmission type will be placed into the same queue while the data packets with different transmission type will be placed into different queues. The checksum field "CS" may indicate a checksum of the packet header information and thus may be used to protect the header from being corrupted. The checksum field "CS" is later used by the error detector 32 to determine whether a checksum error has occurred.

The device 30 may receive the data packets via the bus 40 and then store and distribute the received data packets into corresponding buffers. For example, each of the received data packets may be distributed into a corresponding buffer based on its packet length or priority setting.

The device 30 comprises an error detector 32, a buffering unit (e.g. a first-in-first-out (FIFO) buffer) 34, a queue management unit (QMU) 36 and a plurality of queues 38, formed by a plurality of buffers, wherein each buffer may have identical or different sizes or properties. The QMU 36 is coupled to the queues for parsing and distributing the received data packets into corresponding queues 38 according to a packet header of each received data packet. The error detector 32 is coupled to the buffering unit 34 and is capable of locking or unlocking the buffering unit 34 according to a corresponding request (e.g. a lock command or an unlock command, respectively). In this embodiment, the lock command may be generated by the error detector 32 when the predetermined error has occurred. Once the buffering unit 34 has been locked, the device 30 stops receiving data packets from the host 20 and thus the data packets from the host 20 are prevented from entering into the buffering unit 34. After the buffering unit 34 has been locked, the device 30 then performs a lock procedure corresponding to the lock command. The lock procedure may comprise, for example, steps of clearing the device FIFO and informing the host 20 by a trigger signal (e.g. an interrupt signal) to the host 20. For some other embodiments, the lock procedure may comprise steps of clearing the device FIFO, resetting the QMU to the initial state, and informing the host 20 by a trigger signal to the host.

When receiving a sequence of the data packets packed in data transmissions from the host 20, the error detector 32 first inspects the received data packets (e.g. inspecting the packet header for each data packet or the CRC value of one data block) and determines whether a predetermined error has occurred. For example, the predetermined error may be any kind of abnormal bus condition such as a CRC check error indicating a bus error, a software error, a specific command generated by the host (such as an abort command to abort a current transmission), or a checksum error of a received data packet indicating the data packet has been damaged. In other words, the predetermined error may be lost of synchronization between the host and the device and may be a data packet damaged due to corruption of a packet header. The error detector 32 may inspect the checksum value in the checksum field "CS" of the packet header (FIG. 3) of a received data packet to determine whether the checksum of the received data packet is correct. If the checksum is correct, i.e. the received data packet is correct, the received data packet is then allowed to be stored into the buffering unit 34 and further passed to the QMU 36. Otherwise, it is determined that a checksum error of the received data packet is indicating that the data packet has been damaged. Similarly, the error detector 32 may inspect the CRC value in one data block with multiple data packets to determine whether the CRC check of the received data block is correct. If the CRC check is correct, i.e. the received data block is correct, the received data packet is then allowed to be stored into the buffering unit 34 and further passed to the QMU 36. Otherwise, it is determined that a bus error has occurred.

If any data packet is stored into the buffering unit 34, the QMU 36 retrieves data packets from the buffering unit 34, parses the retrieved data packets and puts the data packets into the corresponding buffers by inspecting the packet header of each stored data packet. Specially, referring to FIG. 3, the QMU 36 may refer to the packet length field "Length" to determine length of the data packet and determine boundary between data packets, and may refer to the transmission type field "Tx Type" to put the data into a corresponding queue 38 via an internal bus (e.g. via an Advanced High-performance Bus (AHB)) between the QMU 36 and the queues 38. After one data packet has been successfully received and parsed, the QMU 36 may further record the sequence number of the successfully received data packet into a register 39. The register 39 is coupled to the QMU 36 for storing a sequence number of the last received data packet after the received data packet has been successfully passed to the QMU 36. In other words, the register 39 records the sequence number of the last received data packet.

The host 20 may further send an unlock request to unlock the buffering unit 34 and send a request to acquire a sequence number of the last received data packet after receiving the signal (e.g. the interrupt signal triggered by the device 30) indicating that the predetermined error has occurred. After acquiring the sequence number of the last received data packet, the host 20 may select the subsequent data packets being retransmitted according to the sequence number of the last received data packet, wherein the first retransmitted subsequent data packet starts with a packet header.

Figure 4:
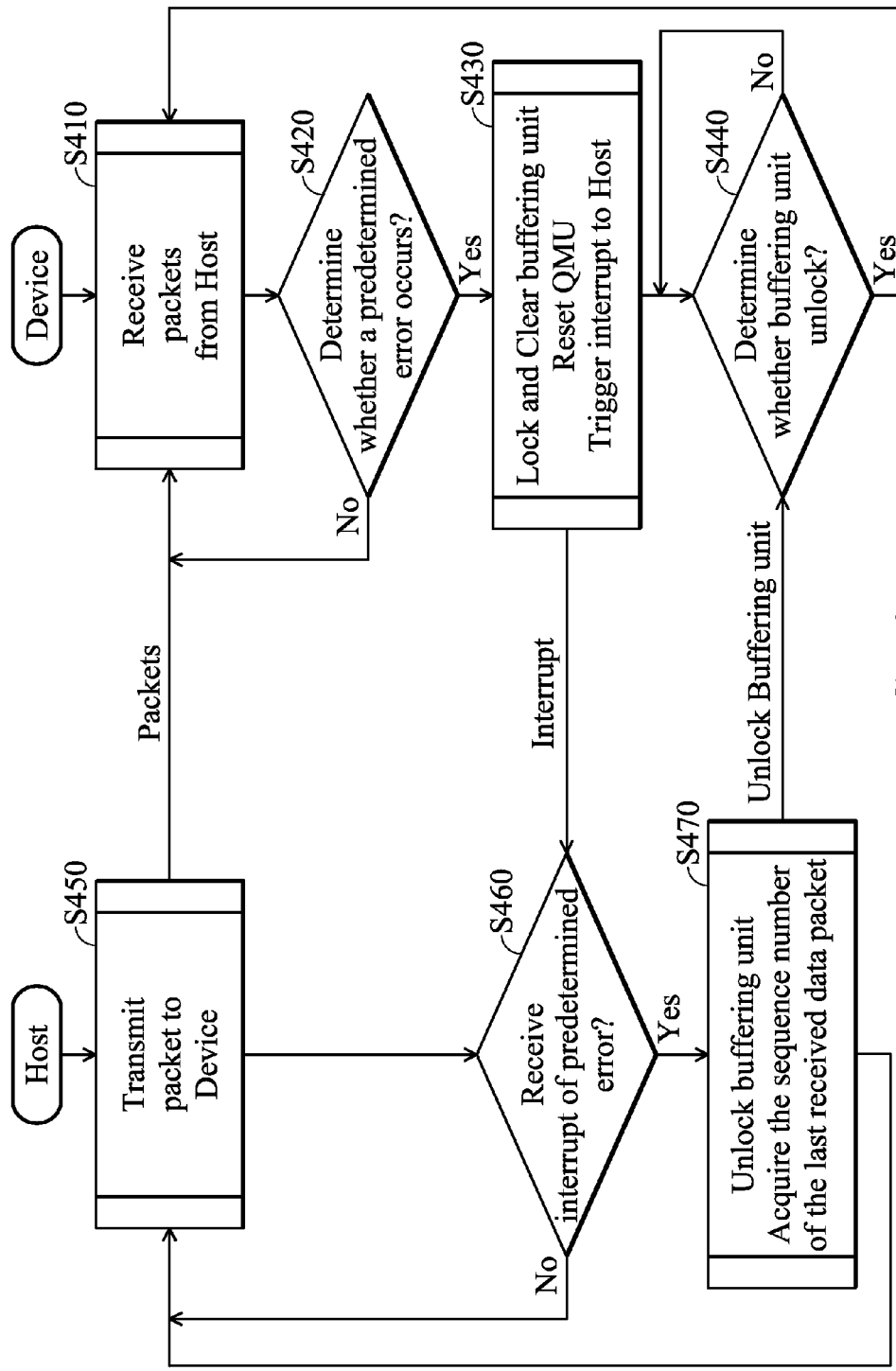
FIG. 4 is a flow chart illustrating a method for bus data transmission between a host and a device according to an embodiment of the invention.

FIG. 4 is a flow chart illustrating a method for bus data transmission between a host and a device according to an embodiment of the invention in which a transmitting flow of data packets for the host is shown on a left side while a receiving flow of data packets for the device is shown on a right side. As shown on the left side of FIG. 4, in the host, the data packets are prepared and sequentially transmitted to the device (step S450). Next, it is determined whether an interrupt signal of a predetermined error, e.g. a lost synchronization caused by a CRC error or a packet being damaged, has been received (step S460). If no such interrupt signal has been received (No in step S460), the flow returns to step S450 such that the host sequentially transmits data packets to the device. If an interrupt signal has been received (Yes in step S460), i.e. the buffering unit (e.g. a FIFO buffer) has been locked, so the host sends an unlock command to unlock the buffering unit and sends a request for acquiring the sequence number of the last received data packet to the device (step S470). The host may acquire the sequence number of the last received data packet from the register of the device. After receiving the request for acquiring the sequence number of the last received data packet, the device acquires the sequence number of the last received data packet from the register and sends the acquired sequence number to the host. In this case, the host may select the subsequent data packets to be retransmitted according to the sequence number of the last received data packet, wherein the first retransmitted subsequent data packet starts with a packet header. For example, the host will rearrange data transmission, so that the data packet subsequent to the data packet with the acquired sequence number is first and resume the data transmission using the rearranged data transmission.

As shown in right side of FIG. 4, in the device, data packets from the host are sequentially received (step S410). Next, it is determined whether a predetermined error, e.g. lost of synchronization caused by a CRC error or a packet being damaged, has occurred (step S420). If no such error has occurred (No in step S420), the flow returns to step S410 to receive subsequent data packets from the host. If a predetermined error has occurred (Yes in step S420), the buffering unit is locked thereby data packets is stopped from being received from the host. Thereafter, a lock procedure is performed (step S430). The lock procedure may comprise, for example, steps of clearing the device FIFO, resetting the QMU to the initial state and informing the host 20 that the predetermined error has occurred by triggering an interrupt signal to the host. After the lock procedure has been performed and the interrupt signal has been triggered to the host, it is then determined whether the locked buffering unit is unlocked (S440). Note that the locked buffering unit (e.g. FIFO buffer) may be unlocked when receiving an unlock command sent by the host. If the buffering unit is still locked, i.e. the host has not yet sent an unlock command (No in step S440), the buffering unit is kept locked until the host sends an unlock command to unlock the locked buffering unit. If the locked device FIFO is unlocked, i.e. an unlock command sent by the host has been received (Yes in step S440), it means that the host already knows the predetermined error has occurred and is prepared to retransmit the subsequent data packets from the point where the data packet was corrupted. Therefore, the flow goes back to step S410 to resume receiving the data packet subsequent to the data packet with the sequence number of the last received data packet. The host may prepare the next data transmissions to retransmit data packets according to the acquired sequence number in which the first retransmitted data packets start with a packet header so that the device receives a packet header and parses the packet header to distribute the data packet to a corresponding queue.

Figure 5A:
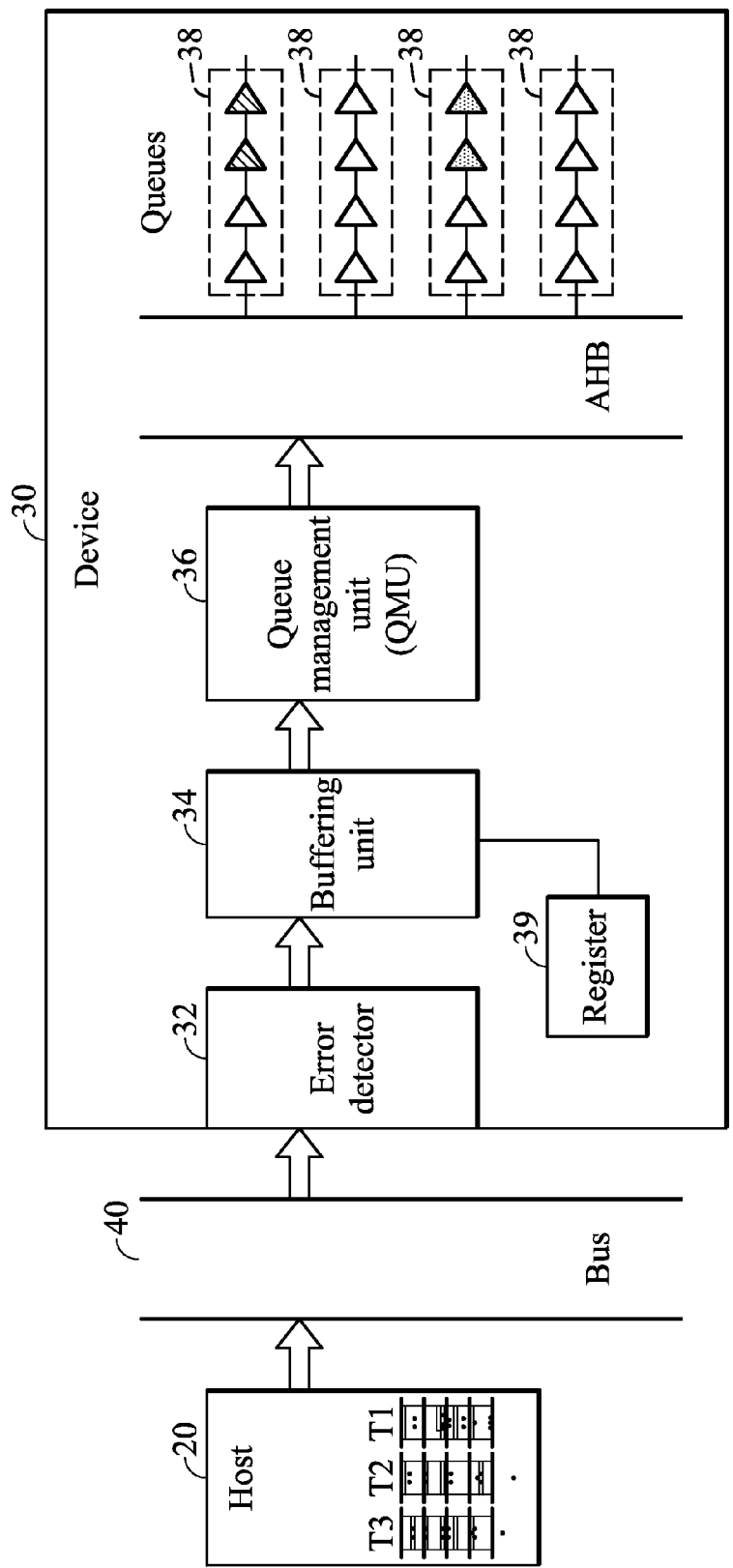
FIGS. 5A to 5D are schematic diagrams illustrating bus data transmission according to an embodiment of a method for bus data transmission of the invention.
Figure 5B:
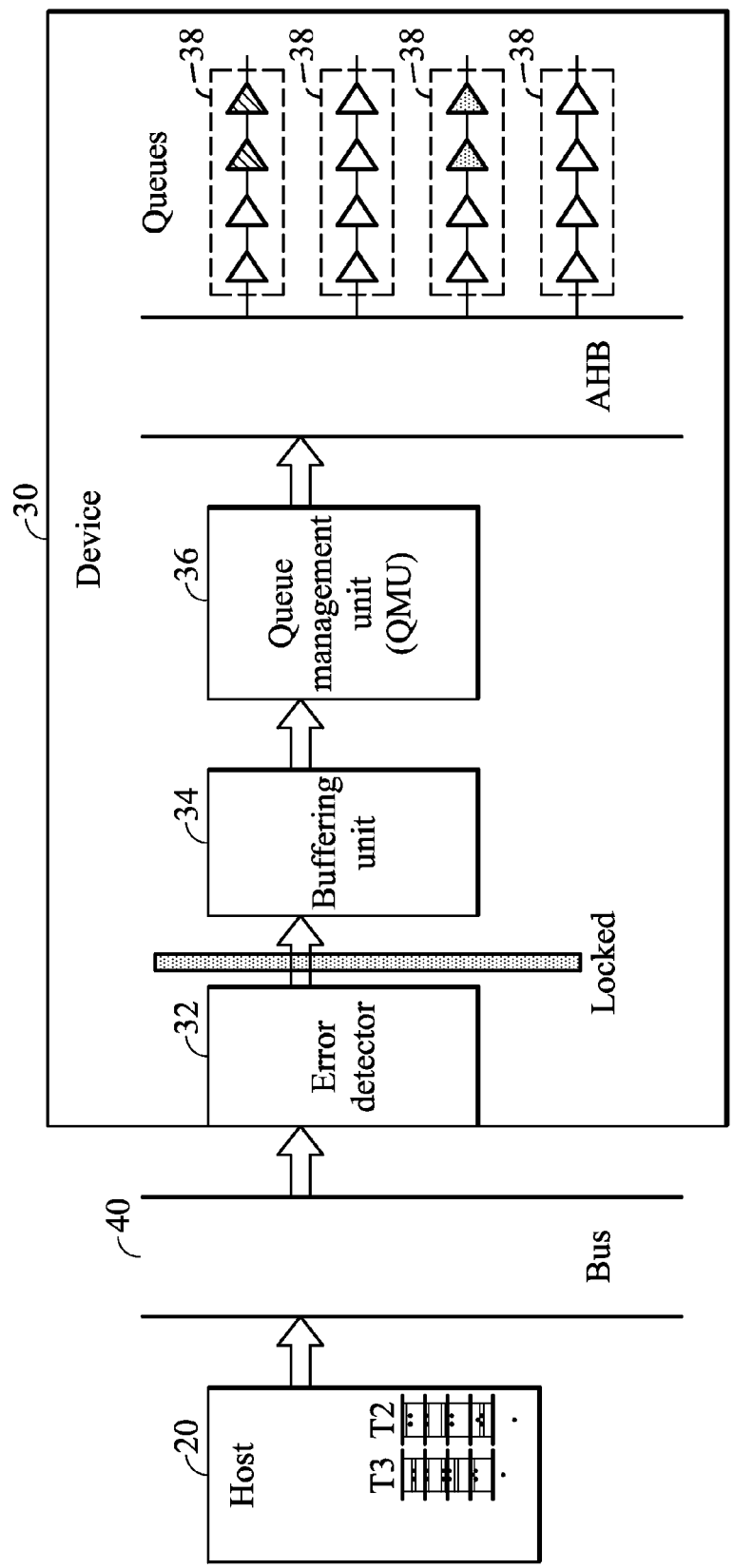
Figure 5C:
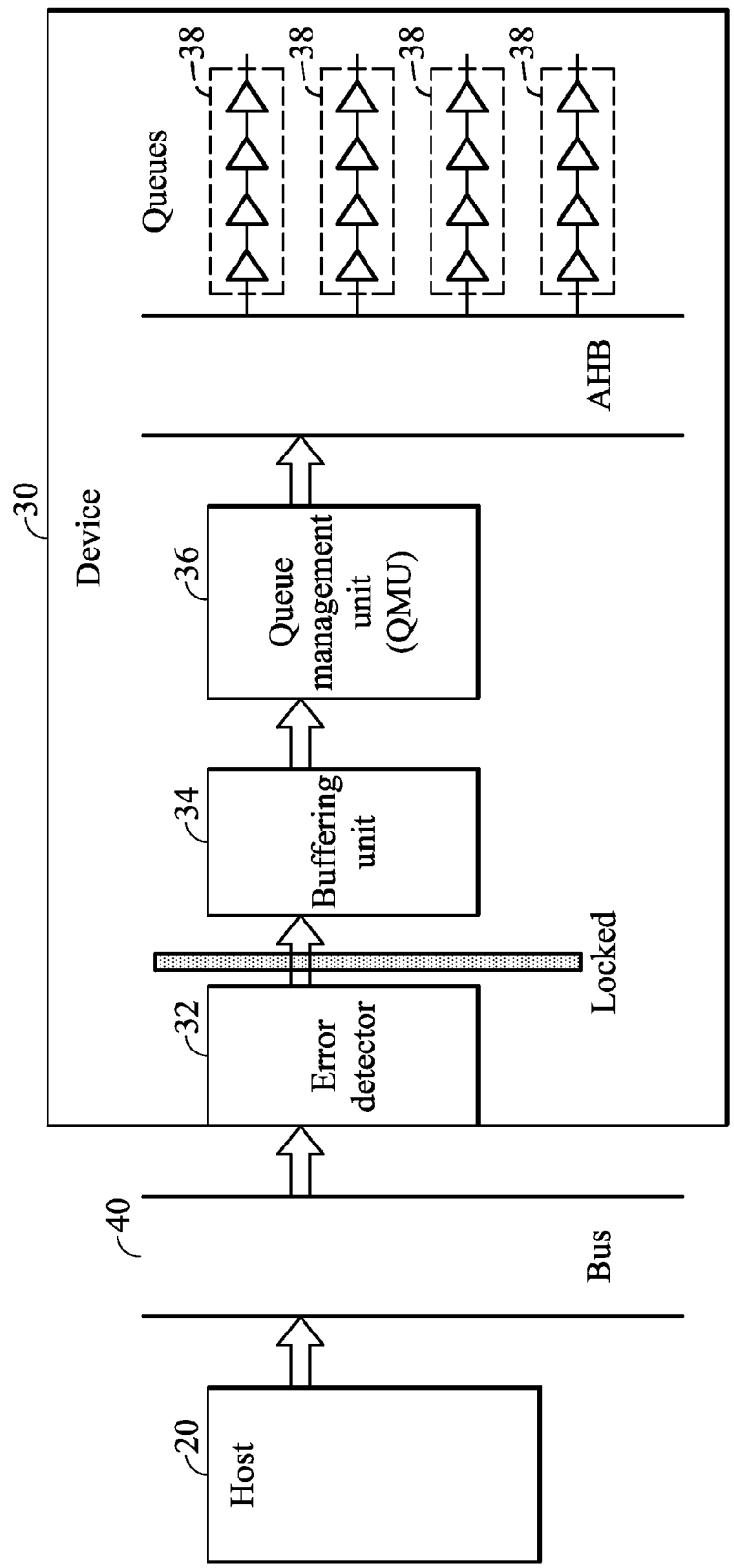
Figure 5D:
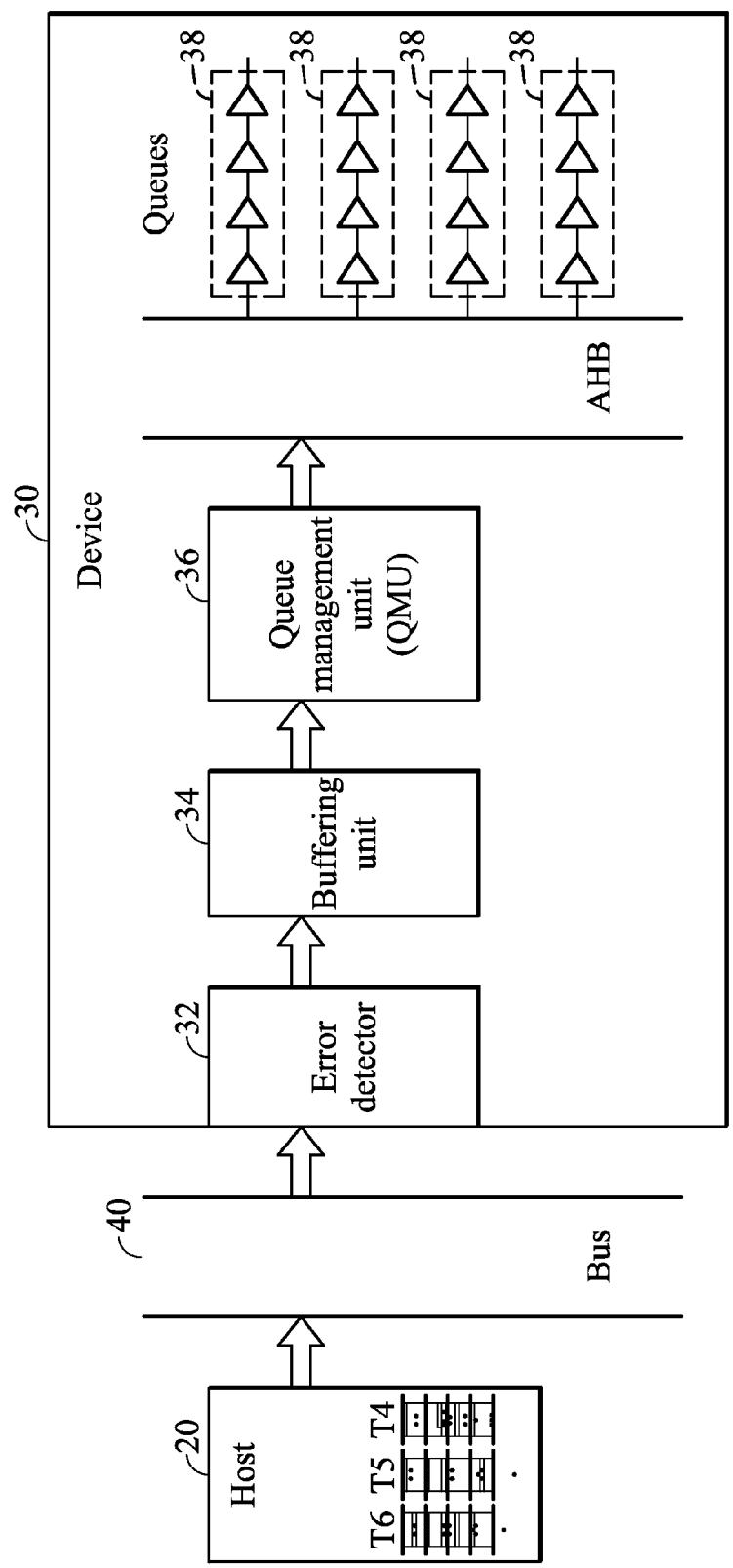

FIGS. 5A to 5D are schematic diagrams illustrating bus data transmission according to an embodiment of a method for bus data transmission of the invention. As shown in FIG. 5A, it is assumed that lost of synchronization/data packet is damaged has occurred during the first transmission T1 due to a CRC error (bus error). Since the host may transmit transmissions asynchronously, even if lost of synchronization/data packet is damaged occurs in the first transmission T1, the host can not stop the following two transmissions (T2 and T3) from being transmitted to the device because the transmissions have already been queued in the host (e.g. bus driver) and are waiting for the host (bus driver) to transmit them. When the error detector of the device determines that the predetermined error (e.g. a bus error) has occurred, the buffering unit (e.g. a device FIFO buffer) is locked to prevent any following data from entering into it as shown in FIG. 5B. And then, the buffering unit is cleared, the QMU is reset to an initial state and an interrupt signal indicating that the predetermined error has occurred is triggered to the host to inform the host. As shown in FIG. 5C, before receiving an unlock command sent by the host, as previously described, even if lost of synchronization/data packet is damaged occurs in the first transmission T1, the host can not stop the following two transmissions so that the following two transmissions T2 and T3 may still be transmitted to the device. However, the transmitted transmissions may not enter into the buffering unit due to the buffering unit being locked. After the interrupt signal has been triggered to the host and the host knows that a predetermined error (e.g. lost of synchronization or packet is damaged) has occurred, as shown in FIG. 5D, the host sends an unlock command to direct the error detector to unlock the locked buffering unit, sends a request command to asks the QMU to acquire the sequence number of the last received data packet and prepares the next data transmissions to retransmit the subsequent data packets according to the acquired sequence number in which the first retransmitted data packets within the data transmissions starts with a packet header. Note that the subsequent data packets to be retransmitted may be selected based on the acquired sequence number. For example, the subsequent data packets to be retransmitted may begin from the data packet with a sequence number subsequent to the data packet with the acquired sequence number or may begin from another data block after the data block of the data packet with the acquired sequence number.

In another embodiment, the predetermined error may be a software error caused by a driver of the host such as the total number of the data packets transmitted to the device exceeding the total number of data buffers provide by the queues. When the predetermined error is a software error, the device may also lock the buffering unit and inform the host by triggering an interrupt signal. In another embodiment, the predetermined error may be a specific command for aborting the current transmission of the data packets sent by the host such as an abort command used in an SDIO bus standard. Similarly, when the predetermined error, such as a specific command, is received, the device may also lock the buffering unit and inform the host by triggering an interrupt signal. In both cases, the host may decide whether to retransmit subsequent data packets when receiving the interrupt signal and use the aforementioned method to unlock the buffering unit to resume data transmission between the host and the device.

In some other embodiments, the error detector 32 can be located in the buffering unit 34 or in the parallel with buffering unit 34. While the error detector 32 is located in the buffering unit 34, the data packets are received by the buffering unit 34. Once the error detector 32 detects the occurrence of the predetermined error, the error detector 32 located in the buffering unit 34 may generate the lock command to lock the buffering unit 34 from receiving the packet data and the buffering unit 34 is cleared according to the lock command. While the error detector 32 is located parallel with the buffering unit 34, the data packets are received by the buffering unit 34 and the error detector 32 simultaneously and the error detector 32 feedbacks the lock commend to the buffering unit 34 if the predetermined error is determined. In another embodiment, the error detector 32 can even be located after the packet data is received in buffering unit 34 and the error detector 32 received the data from buffering unit 34 to check whether predetermined error occurs. If the predetermined error occurs, the error detector 32 sends back a lock command back to the buffering unit 34 and the buffering unit 34 is locked and cleared. Please note the present invention only provides the exemplary embodiments and how to dispose error detector 32 and buffering unit 34 should not be considered as the limitations of the present invention. According to the method of the invention, when a predetermined error has occurred during data transmission, the buffering unit can be locked to prevent following data from entering into it. In addition, the lock mechanism of the present invention is able to assist the device to recover from the error condition quickly and provides the advantage of reducing the system complexity. Moreover, the locked buffering unit may be unlocked by the host to make sure that the host can resynchronize to the device, providing a streaming mode based retransmission mechanism to resynchronize between the host and the device and to retransmit the damaged data packets efficiently.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method for data transmission in a device coupled to a host via a bus, comprising:
receiving a data block packed with a sequence of data packets from the host and storing the received data packets into a buffering unit of the device;
determining whether a predetermined error has occurred with respect to one of the received data packets;
locking the buffering unit of the device to stop receiving incoming data packets when the predetermined error has occurred, wherein the locking the buffering unit is to clear the buffering unit of the data packets which follow in sequence after the received data packet having the predetermined error and reset a queue management unit to an initial state; and
unlocking the buffering unit of the device according to an unlock request from the host to resume receiving subsequent incoming data packets.

2. The method as claimed in claim 1, wherein the step of locking the buffering unit of the device further comprises:
triggering a signal to the host to inform the host that the predetermined error has occurred.

3. The method as claimed in claim 2, further comprising:
receiving a request for acquiring a sequence number of the last received data packet after the host receives the signal; and
sending the sequence number of the last received data packet to the host.

4. The method as claimed in claim 2, wherein the step of resuming to receive subsequent data packets further comprises:
determining whether the buffering unit of the device is unlocked; and
resuming to receive subsequent data packets and storing the received data packets into the buffering unit of the device when the buffering unit of the device is unlocked, wherein the received subsequent data packets are selected according to the sequence number of the last received data packet and the first received subsequent data packet starts with a packet header.

5. The method as claimed in claim 1, wherein the predetermined error is lost of synchronization between the host and the device.

6. The method as claimed in claim 1, wherein the predetermined error is a data packet damaged due to corruption of a packet header.

7. The method as claimed in claim 1, wherein the predetermined error is a specific command generated by the host.

8. A data transmission system, comprising:
a host, providing a sequence of data packets;
a bus; and
a device coupled to the host via the bus, having a buffering unit and a queue management unit coupled to the buffering unit and receiving a data block packed with a sequence of data packets from the host and storing the received data packets into the buffering unit, determining whether a predetermined error has occurred with respect to one of the received data packets, locking the buffering unit of the device to stop receiving incoming data packets when the predetermined error has occurred; and unlocking the buffering unit of the device according to an unlock request from the host to resume receiving subsequent data packets, wherein the device further clears the buffering unit of the data packets which follow in sequence after the received data packet having the predetermined error and resets the queue management unit to an initial state.

9. The data transmission system as claimed in claim 8, wherein the device further triggers a signal to the host to inform the host that the predetermined error has occurred after the buffering unit has been locked, and the host issues an unlock request to unlock the buffering unit and sends a request for acquiring a sequence number of the last received data packet after receiving the signal indicating that the predetermined error has occurred.

10. The data transmission system as claimed in claim 9, wherein the host further selects the subsequent data packets being retransmitted according to the sequence number of the last received data packet, wherein the first retransmitted subsequent data packet starts with a packet header.

11. The data transmission system as claimed in claim 8, wherein the buffering unit is a first-in-first-out (FIFO) buffer.

12. The data transmission system as claimed in claim 8, wherein the bus is a SDIO bus or a USB bus.

13. The data transmission system as claimed in claim 8, wherein the predetermined error is lost of synchronization between the host and the device.

14. The data transmission system as claimed in claim 8, wherein the predetermined error is a data packet damaged due to corruption of a packet header.

15. A method for data transmission between a device and a host via a bus, comprising:
transmitting a data block packed with a sequence of data packets, each data packet transmitted with a packet header;
receiving the transmitted data block packed with the data packets from the host and storing the received data packets into a buffering unit of the device;
determining whether a predetermined error has occurred with respect to one of the received data packets;

locking the buffering unit of the device to stop receiving incoming data packets when the predetermined error has occurred;

determining when a signal triggered by the device for informing that the predetermined error has occurred is received;

sending an unlock request to the device for unlocking the buffering unit of the device; and retransmitting subsequent data packets to the device that follow in sequence after the received data packet having the predetermined error, wherein the step of locking the buffering unit of the device further comprises clearing the buffering unit of the data packets which follow in sequence after the received data packet having the predetermined error and resetting a queue management unit to an initial state.

16. The method as claimed in claim 15, wherein the subsequent data packets being retransmitted are selected according to a sequence number of the last received data packet, wherein the first retransmitted subsequent data packet starts with a packet header.

17. The method as claimed in claim 15, wherein the step of locking the buffering unit of the device further comprises:

triggering the signal to the host to inform the host that the predetermined error has occurred.

18. A data transmission apparatus for handling an abnormal bus condition, comprising:

a buffer unit for receiving a data block packed with a sequence of data packets and storing the received data packets;

wherein the buffering unit is locked to stop receiving incoming data packets when at least one predetermined error has occurred with respect to one of the received data packets; and wherein the buffering unit is unlocked according to an unlock request from the host to resume receiving subsequent data packets that follow in sequence after the received data packet having the predetermined error, and wherein the apparatus further clears the buffering unit of the data packets which follow in sequence after the received data packet having the predetermined error and resets a queue management unit of the apparatus to an initial state.

19. The data transmission apparatus as claimed in claim 18, wherein the apparatus further comprises an error detector coupled to the buffering unit for determining whether the predetermined error has occurred and for locking or unlocking the buffering unit.

20. The data transmission apparatus as claimed in claim 19, wherein the apparatus further comprises:

a plurality of queues, wherein the queue management unit is coupled to the queues for parsing and distributing the received data packets into corresponding queues according to a packet header of each received data packet.

21. The data transmission apparatus as claimed in claim 20, wherein the apparatus further triggers a signal to the host to inform the host that the predetermined error has occurred after the buffering unit has been locked.

22. The data transmission apparatus as claimed in claim 21, wherein the apparatus further receives a retransmitted subsequent data packet and wherein the first retransmitted subsequent data packet starts with a packet header.

23. The data transmission apparatus as claimed in claim 20, wherein the apparatus further comprises a register coupled to the queue management unit for storing a sequence number of the last received data packet after the received data packet is successfully passed to the queue management unit.

* * * * *